Patented Nov. 3, 1925.

1,559,799

UNITED STATES PATENT OFFICE.

COLIN JAMES SMITHELLS, OF OXHEY, ENGLAND, ASSIGNOR TO THE GENERAL ELECTRIC COMPANY LIMITED, OF LONDON, ENGLAND.

MANUFACTURE OF TUNGSTEN.

No Drawing. Application filed June 5, 1922. Serial No. 566,135.

To all whom it may concern:

Be it known that I, COLIN JAMES SMITHELLS, a subject of the King of England, residing at Oxhey, Hertfordshire, England, have invented certain new and useful Improvements in the Manufacture of Tungsten, of which the following is a specification.

This invention relates to the manufacture of tungsten metal and more particularly of metal for the production of filaments for incandescent electric lamps and the like.

The object of the invention is to produce a metal which, when made into filaments and more particularly spiralled filaments, will retain much of its original strength, and other desirable qualities after being maintained for many hours at a high temperature in an electric incandescent lamp.

It has been proposed previously to add to the tungsten compound from which the metal is made such substances as will introduce into the resulting metal suitable proportions of oxides irreducible by hydrogen; examples of such oxides are lime, thoria, alumina, silica. The presence of these oxides in the metal hinders the growth and re-arrangement of the crystals of the filament which takes place during the life of the lamp and which is a cause of the deterioration of pure tungsten filaments. After long continued heating filaments containing such oxides are known to be stronger than pure tungsten filaments, but they have lost almost all their ductility and cannot be deformed permanently without breaking.

It has been found that the loss of ductility strength and other desirable properties of the filament after long continued heating will be very much less if there be added to the tungsten compound from which the metal is made other substances, besides those which introduce into the resulting metal oxides irreducible by hydrogen. These other substances are compounds of the alkali metals.

According to the present invention there are added to the tungsten compound from which the metal is made (1) a suitable proportion of some substance which will introduce into the resulting metal an oxide irreducible by hydrogen and (2) a suitable proportion of some compound of an alkali metal.

Of the oxides comprised in (1) of the preceding paragraph the most suitable are those which, like thoria, are not appreciably volatile at the highest temperature to which the metal is to be raised. A suitable proportion is one which will leave from 1% to 0.5% e. g. about 0.75% of say, thoria, in the ingot. The addition of thoria may be made in the usual manner.

The compound of an alkali metal may be added to the tungsten compound either before or after tungstic acid is precipitated. If it be added after precipitation and if sodium chloride be used from 0.3% to 0.03% say about 0.2% of that salt should be added to the tungstic acid, the exact proportion depending upon the temperature at which the subsequent reduction is performed. If it be added before precipitation, the amount to be added will depend upon the conditions of the precipitation and upon the subsequent washing of the tungstic acid; for these factors will determine how much of the compound is left in the washed tungstic acid. If the compound left be sodium chloride, a suitable proportion to be left is again from 0.3% to 0.03% say about 0.2%. This proportion may also be attained by using sodium tungstate as the original tungsten compound, precipitating with hydrochloric acid and washing the precipitate for a suitable time.

Equally good results have been obtained by the use of the other alkali metals such as caesium or potassium in place of sodium using the methods described, for instance from 0.5% to 0.05% of caesium chloride may be used.

The subsequent reducing, pressing, sintering, swaging and drawing processes may be carried out in the usual manner.

An example of how my invention may be performed is as follows:—

Tungstic oxide is made into a paste with water, and a solution of sodium chloride containing an amount of that salt equivalent to 0.2% of the weight of the tungstic oxide, is intimately mixed with it, a solution of thorium nitrate containing an amount of thoria equivalent to 0.65% of the weight of the tungstic oxide is then added, and the whole well stirred. The paste is dried, and reduced in hydrogen in the usual manner. We have found that with these proportions of sodium chloride and thoria the best results are obtained if the reduction be carried out for four hours at a temperature of about 1050° C.

The presence of the combination of additives (1) and (2) does not hinder the growth and re-arrangement of the crystals of the filament during the life of the lamp as does the presence of additive (1) alone. On the contrary, if the filament be coiled into a close spiral such as is used in gas-filled electric incandescent lamps, crystalline growth proceeds during the first few hours of burning in such a manner that long crystals of the metal are formed occupying several turns of the spiral. After the first few hours these crystals almost cease to grow and no further material change takes place in the crystalline structure of the filament for many hundreds of hours of burning.

Spirals made according to this invention and consisting, in part, of these long crystals occupying several turns of the spiral sag very little during the life of the lamp, and can withstand considerable mechanical shock after a life of several hundred hours.

The wire made according to this invention may also be used advantageously for the straight or zig-zag filaments of vacuum lamps, and when used for such filaments retains its mechanical strength well after a long period of burning.

What I claim and desire to secure by Letters Patent in the United States is:—

1. A process for the manufacture of tungsten metal suitable for the filaments of incandescent electric lamps according to which there is added to the tungsten compound before reduction to metal a combination of additives consisting of (1) not more than 1% of a substance which will introduce into the resulting metal a non-volatile oxide irreducible by hydrogen, and (2) not more than .5% of a compound of an alkali metal which is decomposed in the subsequent treatment of the mixture in hydrogen.

2. A process for the manufacture of tungsten metal according to which there is left in the tungstic acid before reduction as additive (1) from 1% to 0.5% of thoria and as additive (2) from 0.3% to 0.03% of sodium chloride.

3. A process for producing tungsten filaments, which consists in adding to tungstic oxide a combination of additives consisting of (1) not more than 1% of a substance which will introduce into the resulting metal a non-volatile oxide irreducible by hydrogen and (2) not more than 0.5% of a compound of an alkali metal which is decomposable by hydrogen, and thereafter reducing the mixture by hydrogen to metal, sintering the product to produce an ingot, and working the ingot into wire.

COLIN JAMES SMITHELLS.